(12) United States Patent
Sankaralingam et al.

(10) Patent No.: US 11,853,244 B2
(45) Date of Patent: Dec. 26, 2023

(54) RECONFIGURABLE COMPUTER ACCELERATOR PROVIDING STREAM PROCESSOR AND DATAFLOW PROCESSOR

(71) Applicant: Wisconsin Alumni Research Foundation, Madison, WI (US)

(72) Inventors: Karthikeyan Sankaralingam, Madison, WI (US); Anthony Nowatzki, Madison, WI (US); Vinay Gangadhar, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1225 days.

(21) Appl. No.: 15/416,670

(22) Filed: Jan. 26, 2017

(65) Prior Publication Data

US 2018/0210730 A1 Jul. 26, 2018

(51) Int. Cl.

| | |
|---|---|
| G06F 9/38 | (2018.01) |
| G06F 15/78 | (2006.01) |
| G06F 13/40 | (2006.01) |
| G06F 13/16 | (2006.01) |
| G06F 9/30 | (2018.01) |
| G06F 9/448 | (2018.01) |
| G06F 15/76 | (2006.01) |
| G06F 9/345 | (2018.01) |
| G06F 15/82 | (2006.01) |

(52) U.S. Cl.
CPC ...... *G06F 13/4022* (2013.01); *G06F 9/30087* (2013.01); *G06F 9/3455* (2013.01); *G06F 9/3834* (2013.01); *G06F 9/3877* (2013.01); *G06F 9/4494* (2018.02); *G06F 13/1689* (2013.01); *G06F 15/76* (2013.01); *G06F 15/7889* (2013.01); *G06F 15/825* (2013.01)

(58) Field of Classification Search
CPC .. G06F 9/3877; G06F 9/3885; G06F 15/7889; G06F 15/825

See application file for complete search history.

(56) References Cited

U.S. PATENT DOCUMENTS

| | | | |
|---|---|---|---|
| 7,590,823 B1 * | 9/2009 | Ansari | G06F 9/30145 |
| | | | 712/200 |
| 2006/0059310 A1 * | 3/2006 | Asher | G06F 9/30014 |
| | | | 711/126 |
| 2006/0251092 A1 | 11/2006 | Matterne et al. | |

(Continued)

OTHER PUBLICATIONS

Shantanu Gupta; Shuguang Feng; Amin Ansari; Scott Mahlke; David August. "Bundled execution of recurring traces for energy-efficient general purpose processing" 44th Annual IEEE/ACM International Symposium on Microarchitecture (MICRO) (Year: 2011).*

(Continued)

*Primary Examiner* — Jacob Petranek
(74) *Attorney, Agent, or Firm* — Boyle Fredrickson, S.C.

(57) ABSTRACT

A reconfigurable hardware accelerator for computers combines a high-speed dataflow processor, having programmable functional units rapidly reconfigured in a network of programmable switches, with a stream processor that may autonomously access memory in predefined access patterns after receiving simple stream instructions. The result is a (Continued)

compact, high-speed processor that may exploit parallelism associated with many application-specific programs susceptible to acceleration.

2 Claims, 4 Drawing Sheets

(56) References Cited

U.S. PATENT DOCUMENTS

| | | | |
|---|---|---|---|
| 2007/0186036 A1* | 8/2007 | Bittner, Jr. | G11C 15/00 711/108 |
| 2008/0244238 A1 | 10/2008 | Mitu | |
| 2009/0217266 A1 | 8/2009 | Krishnamurthy et al. | |
| 2009/0300337 A1 | 12/2009 | Wang et al. | |
| 2010/0199069 A1* | 8/2010 | Kim | G06F 9/3897 712/30 |
| 2011/0238948 A1* | 9/2011 | Vorbach | G06F 15/7867 712/15 |
| 2012/0011349 A1* | 1/2012 | Khailany | G06F 9/30014 712/225 |
| 2012/0204008 A1* | 8/2012 | Dockser | G06F 9/3802 712/208 |
| 2012/0303932 A1* | 11/2012 | Farabet | G06F 15/7867 712/30 |
| 2015/0261528 A1 | 9/2015 | Ho et al. | |
| 2015/0268963 A1 | 9/2015 | Etsion et al. | |
| 2016/0048396 A1* | 2/2016 | Wiencke | G06F 9/3877 712/34 |
| 2017/0024167 A1 | 1/2017 | Lavasani | |
| 2017/0083313 A1* | 3/2017 | Sankaralingam | G06F 15/7867 |

OTHER PUBLICATIONS

Cilviu Ciricescu et al.; "The reconfigurable streaming vector processor (RSVPTM)." In Proceedings of the 36th annual IEEE/ACM International Symposium on Microarchitecture, pp. 1-10; IEEE Computer Society, 2003. US.

Angshuman Parashar et al.; "Triggered instructions: A control paradigm for spatially-programmed architectures." In ACM SIGARCH Computer Architecture News, vol. 41, No. 3, pp. 142-153. ACM, 2013. US.

Brucek Khailany et al.; "Imagine: Media processing with streams." IEFE micro 21, No. 2 (2001): pp. 35-46. US.

International Search Report dated Sep. 27, 2018; 16 pages.

Venkatesh et al."Conservation cores: reducing the energy of mature computations." In ACM SIGARCH Computer Architecture News, vol. 38, No. 1, pp. 205-218. ACM, 2010. US.

Fan et al. "Increasing hardware efficiency with multifunction loop accelerators." In Hardware/Software Codesign and System Synthesis, 2006. Codes+ ISSS'06. Proceedings of the 4th International Conference, pp. 276-281. IEEE, 2006. US.

Baumgarte V et al.: "Pact XPP—A Self-Reconfigurable Data Processing Architecture" Journal of Supercomputing, Kluwer Academic Publishers, Dordrecht, NL, vol. 26, Jan. 1, 2003; pp. 167-184 US.

Anonymous; "Coprocessor—Wikipedia" Retrieved from the Internet URL:https://en.wikipedia.org/w/index.php?title=Copressor&oldid= 757515844; Dec. 31, 2016. US.

\* cited by examiner

RECONFIGURABLE COMPUTER ACCELERATOR PROVIDING STREAM PROCESSOR AND DATAFLOW PROCESSOR

STATEMENT REGARDING FEDERALLY SPONSORED RESEARCH OR DEVELOPMENT

This invention was made with government support under CNS1218432 awarded by the National Science Foundation. The government has certain rights in the invention.

CROSS REFERENCE TO RELATED APPLICATION

--

BACKGROUND OF THE INVENTION

The present invention relates to electronic computer architectures and in particular to an application-specific computer accelerator that can be reconfigured for different applications.

The need for increased computer processing speed and improved energy efficiency has motivated the development of data-parallel architectures like single instruction multiple data (SIMD) machines and general-purpose graphic processing units (GPGPU) machines that can replace general-purpose von Neumann type processors for many applications. For even more demanding applications such as machine learning and computer vision, these general-purpose data-parallel architectures may be replaced with application-specific accelerators such as the Microsoft Catapult FPGA accelerator, for use in data centers, and Google's Tensor processing unit for distributed machine learning. These application-specific accelerators are normally teamed with a general purpose, high-performance von Neumann processor, for example, implementing advanced architectural features including out-of-order execution and speculative execution.

The special-purpose hardware used in these application-specific accelerators adversely affects the implementation of new processing algorithms. This is because new algorithms, as executed on the special-purpose hardware of an accelerator, normally require a costly redesign and verification of a new architecture. In addition, the narrow functionality of application-specific accelerators limits their value in computer systems where a wide range of applications must be implemented. Finally, to the extent that such application-specific accelerators address niche markets, they may not attract academic interest such as promotes analysis and improvement in these architectures.

SUMMARY OF THE INVENTION

The present inventors have recognized that, despite the wide variety of application-specific accelerators, there are certain common features of the software they execute. Specifically, software executed by application-specific accelerators tends to have simple memory and reuse patterns and high computational intensity in long phases. This in turn suggests that a "general-purpose" application-specific accelerator could be constructed by combining a stream processor that can automatically handle simple memory access patterns with a fast, efficient processor for handling computational intensity. This latter processing requirement can be met by a dataflow processor adapted to be quickly reconfigured. The result is a general-purpose accelerator that is competitive with application-specific accelerators while avoiding the drawbacks associated with special-purpose hardware.

Accordingly, in one embodiment, the invention provides a reconfigurable accelerator architecture including: (1) a microcontroller adapted to receive instructions and data to control other components of the accelerator; (2) a stream processor receiving instructions from the microcontroller to autonomously read multiple input values stored in memory according to a selected set of predefined memory access patterns and to autonomously write multiple output values from the accelerator to memory according to a selected set of predefined memory access patterns; and (3) a reconfigurable dataflow processor configured by the microcontroller to receive the multiple input values to provide output values based on that configuration.

It is thus a feature of at least one embodiment of the invention to implement the common functions of fixed special-purpose accelerators in a reconfigurable accelerator that can implement the function of many special-purpose accelerators. Current simulations suggest the architecture of the present invention can match performance of special-purpose accelerators, providing the advantage of versatility with tolerably small increases in power consumption and circuit area.

The reconfigurable dataflow processor may provide a set of programmable switches interconnecting functional units in a mesh between input ports receiving input values and output ports providing output values, the functional units providing selectable multiple arithmetic functions, the mesh providing paths from input ports through functional units to output ports determined by the switch programming.

It is thus a feature of at least one embodiment of the invention to provide a high-speed data flow processor comparable in speed to those found in fixed purpose accelerators and yet rapidly re-reprogrammable, for example, through the use of image files setting the switches and configuring the functional units.

The mesh may provide direct interconnections between switches and functional units and direct interconnections between switches.

It is thus a feature of at least one embodiment of the invention to provide a versatile mesh that may both interconnect functional units and bypass functional units.

The mesh may provide for at least thirty-two parallel data lines, for example, as many as sixty-four parallel data lines, between switches and between switches and functional units.

It is thus a feature of at least one embodiment of the invention to provide rapid communication of large data words consistent with current processing architectures.

The functional units may provide different selections of arithmetic and logical operations.

It is thus a feature of at least one embodiment of the invention to permit the use of heterogeneous functional units allowing a flexible trade-off between versatility and chip area.

The functional units may operate in parallel.

It is thus a feature of at least one embodiment of the invention to provide a high degree of parallelism in the computational engine.

The data flow between functional units may be determined by switch settings and the dataflow processor may further include a clock permitting the moving of data between switches by one switch or between functional units by one functional unit for each clock cycle.

It is thus a feature of at least one embodiment of the invention to provide a clocking function to allow operands of multistage calculations to be coordinated through switch settings that provide proper selection of their path through the mesh.

The microcontroller may control the reconfigurable dataflow processor by loading an image file defining programming of the switches and selection of the functions of the functional units.

It is thus a feature of at least one embodiment of the invention to provide extremely rapid change in configuration of the dataflow processor without the need for compilation.

The microcontroller may be a von Neumann, single-issue, in-order core.

It is thus a feature of at least one embodiment of the invention to provide a flexible circuit for coordinating the elements of the accelerator that requires low-power and small chip areas and that, in some situations, can be used to execute a larger instruction set than possible with the dataflow processor.

The microcontroller may be further adapted to receive instructions and data from the primary processor to execute logical and arithmetic instructions in response to the instructions and data to return data to the primary processor without involvement of the stream processor or the reconfigurable dataflow processor.

It is thus a feature of at least one embodiment of the invention to allow the use of the microcontroller without the dataflow processor for certain tasks.

The stream processor may provide pre-defined memory access patterns including a linear access pattern of contiguous addresses between two memory addresses and a strided access pattern of regularly spaced discontiguous addresses between two memory addresses.

It is thus a feature of at least one embodiment of the invention to provide memory access patterns commonly used in application-specific acceleration.

The stream processor may use data obtained with the pre-defined memory access patterns as addresses of data to be used as the multiple input values provided to the reconfigurable dataflow processor.

It is thus a feature of at least one embodiment of the invention to provide for indirect addressing implementing pointer-type functionality.

The stream processor may operate autonomously with respect to the microcontroller after programming by the microcontroller.

It is thus a feature of at least one embodiment of the invention to provide extremely fast memory access operations possible with a dedicated state machine or similar design permitting the dataflow processor to be efficiently focused on calculations only.

The reconfigurable dataflow processor may include input and output buffers to decoupled access-execute operations permitting operation asynchronously with respect to the stream processor.

It is thus a feature of at least one embodiment of the invention to permit a decoupling between memory operations and calculations for improved parallelism.

The microcontroller may issue stream commands to the stream processor defining a data source, a data destination, and an access pattern of data.

It is thus a feature of at least one embodiment of the invention to provide an extremely simple instruction set for stream processing.

The microcontroller may further issue barrier commands to the stream processor defining a necessary completion order of memory accesses before and after the barrier command.

It is thus a feature of at least one embodiment of the invention to provide a simple mechanism for limiting parallelism when necessary to avoid race conditions or problems with data dependencies.

The computer architecture may further include a scratchpad memory communicating with the stream processor to read data from the memory or write data to the memory as controlled by the stream processor.

It is thus a feature of at least one embodiment of the invention to eliminate unnecessary memory accesses for improved execution speed.

The computer architecture may include a single memory interface shared by the scratchpad memory and the reconfigurable dataflow processor.

It is thus a feature of at least one embodiment of the invention to simplify the elemental component of the accelerator while still allowing high-bandwidth communication with memory among the dataflow processors.

The microcontroller may respond to predetermined instructions to provide information about the number and type of functional units in the reconfigurable dataflow processor.

These particular objects and advantages may apply to only some embodiments falling within the claims and thus do not define the scope of the invention.

DETAILED DESCRIPTION OF THE PREFERRED EMBODIMENT

Figure 1:
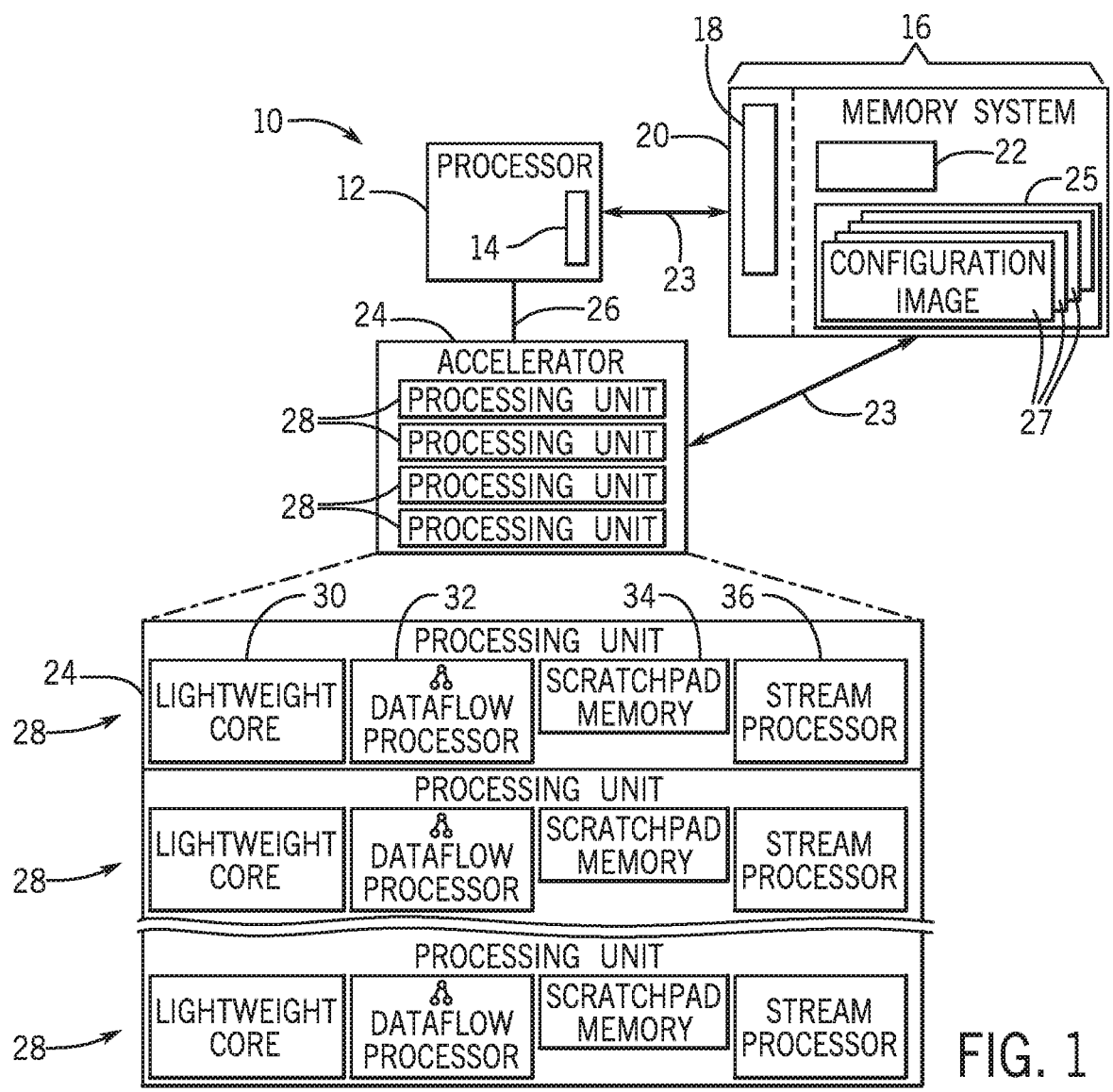
FIG. 1 is a block diagram of a processor system employing the reconfigurable application-specific accelerator of the present invention and providing an expanded detail of the accelerator comprised of multiple stream-dataflow processors.

Referring now to FIG. 1, a computer system 10 constructed according to the present invention may provide for a high-performance, von Neumann processor 12, for example, providing for out-of-order execution and speculative execution of a rich instruction set of arithmetic and logical instructions. Examples of such processors 12 include those manufactured by the Intel Corporation under the trade name of "i7" as well as similar devices manufactured by Advanced Micro Devices, Inc. and ARM Ltd.

The processor 12 may include an L1 cache 14 for communication with a memory system 16 providing a standard memory hierarchy including but not limited to additional levels of cache 18 coupled with one or more layers of larger scale memory 20, for example, composed of random access memory (RAM), disk memory and the like.

The memory system 16 may store a program 22 for execution by the computer system 10 such as may benefit from hardware acceleration, for example, including vision processing, machine learning, graph processing or the like.

The memory system 16 and the processor 12 may communicate with a reconfigurable hardware accelerator 24, for example, by control lines 26 as well as address and data lines 23 allowing the processor 12 to enlist the hardware accelerator 24 for execution of portions of the program 22 amenable to acceleration. Using the control lines 26 and/or data transferred through the memory system 16 by the address and data lines 23, the processor 12 may offload intense calculations having simple memory access patterns to the hardware accelerator 24 for independent execution. In this regard the processor 12 coordinates the beginning and conclusion of that execution but may shut down or be used for other tasks during that calculation. During operation, the hardware accelerator 24 may independently access the memory system 16 at the L2 cache in the manner of a multicore processor autonomously without assistance of the processor 12.

The memory system 16 may include a set of configuration files 25 providing configuration images 27 that will be used to program a specific application-specific calculation to be performed by the hardware accelerator 24 for the desired portions of the program 22. By loading different configuration images 27, different application-specific calculations may be optimized. These configuration images 27 may be developed and standardize for particular applications, for example, to provide different functionalities of conventional application-specific accelerators using the current design of the hardware accelerator 24. Generally the hardware accelerator 24 will be invoked using special instructions that will be described below which may be generated by a compiler.

Figure 2:
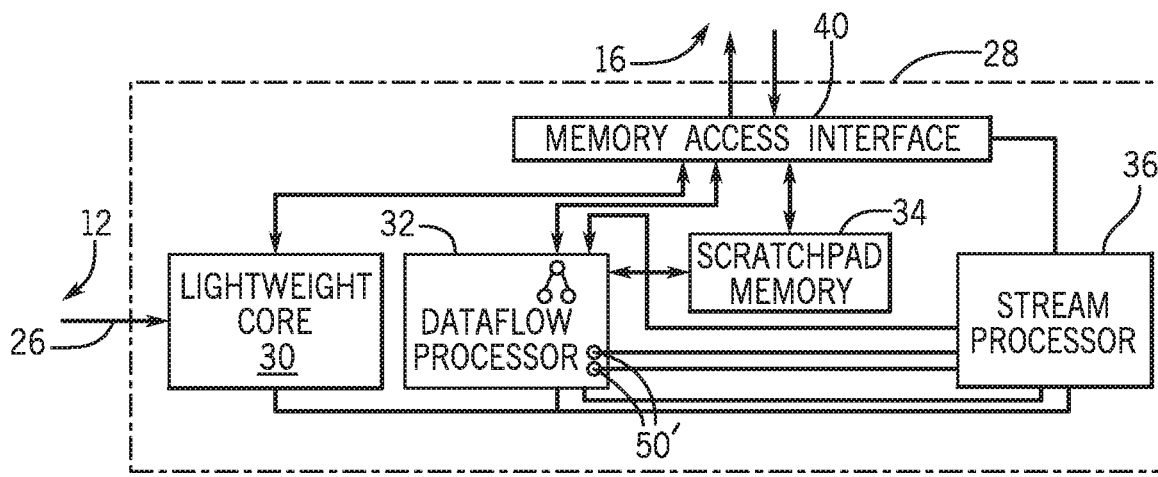
FIG. 2 is a detailed block diagram of a single stream-dataflow processor showing the combination of a lightweight core with a dataflow mesh, scratchpad memory and stream processor.

Referring now also to FIG. 2, the hardware accelerator 24 may include multiple independently operating processing units 28 that each may receive portions of the program 22 to operate in parallel. Each processing unit 28 includes a lightweight core 30, a dataflow processor 32, a scratchpad memory 34 and a stream processor 36. In one embodiment, each of the lightweight core 30, dataflow processor 32, scratchpad memory 34, and stream processor 36 of a given processing unit 28 may share a common memory access interface 40 to the memory system 16 to provide independent and parallel memory access among the processing units 28.

Generally, the lightweight core 30 will be a von Neumann, single-issue, in-order core without speculative execution. Nevertheless, this lightweight core 30 will be able to handle a wider range of different types of arithmetic and logical instructions than the dataflow processor 32 and for this reason may be used by the processor 12 for some types of acceleration without involvement of the remainder of the processing unit 28 including, for example, the data flow processor 32. The lightweight core 30 will require much less integrated circuit area than the processor 12 and will use much less power. It will be appreciated that the lightweight core may be any general purpose processor capable of arithmetic and logical functions.

During typical operation, the lightweight core 30 will issue instructions to the stream processor 36 to load a configuration image 27 from the memory system 16 to dataflow processor 32 that will configure the dataflow processor 32 for the necessary calculations. The lightweight core 30 will then issue instructions to the stream processor 36 which in turn will control the memory access interface 40 to obtain information necessary for calculation by the dataflow processor 32 sending this data either directly to the dataflow processor 32 or to a scratchpad memory 34.

The instructions provided by the lightweight core 30 to the stream processor 36 will include: (1) configuration instructions for configuring the dataflow processor 32 by obtaining and loading and appropriate configuration image 27; (2) stream instructions for providing a stream of data to the dataflow processor 32 without involvement of the lightweight core 30 or the processor 12; and (3) barrier instructions used to enforce some degree of serialization of the instructions executed by the processing unit 28 as will be discussed below.

Figure 3:
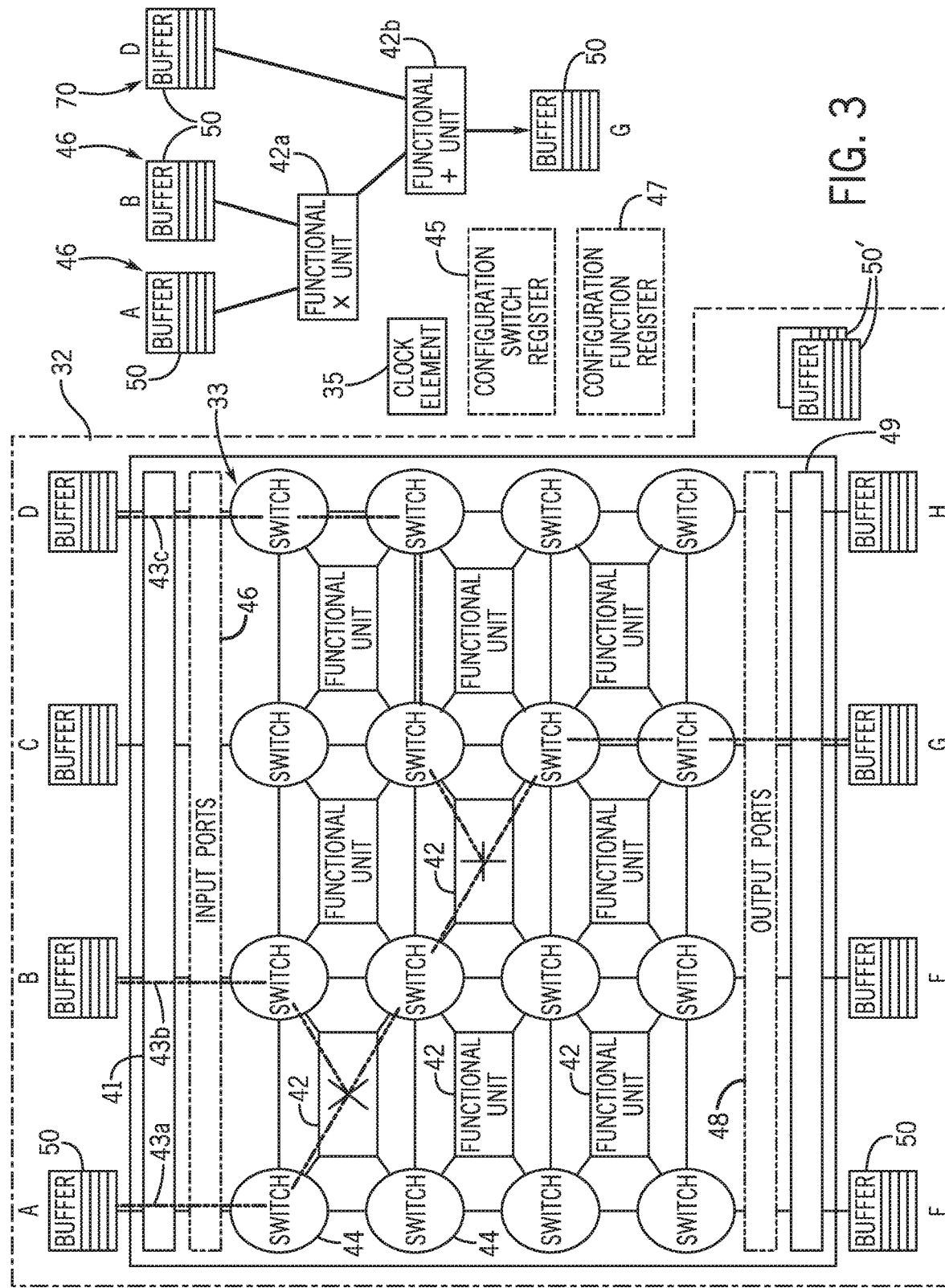
FIG. 3 is a detailed block diagram of the dataflow mesh showing implementation of a simple dataflow graph.

Referring now to FIG. 3, the dataflow processor 32 may provide for a set of functional units 42 arranged in a mesh 33 formed by interconnecting switches 44. The switches 44 are arranged in logical columns extending from input points 46 to corresponding output points 48 to provide parallel data paths therebetween. Switches 44 are also arranged in logical rows joined by parallel data paths equal in width to the width of the data paths of the logical columns. The functional units 42 are positioned logically between sets of four switches 44 in successive rows and columns to communicate with each of those switches 44 to receive data therefrom or provide data thereto. Each switch 44 may therefore generally direct data received at the switch 44 to a switch in an adjacent column or in a lower adjacent row or to up to two lower functional units 42.

The particular direction of data flow provided by the switch 44 may be determined by a bit value in a mesh 33 configuration switch register 45 associated with the switches 44 determined by a particular configuration image 27 being loaded. The data paths provided by the mesh 33 from an input point 46 through successive switches 44 and functional units 42 to an output point 48 will generally be equal to the width of a computer word, for example, thirty-two or sixty-four bits.

Each of the functional units 42 may implement one of several arithmetic or logical functions but generally fewer functions than provided by the lightweight core 30. For example, a given functional unit 42 may implement one or more of integer or floating-point multiplication, subtraction, addition, etc.; and/or logical functions such as shift, compare, bit wise AND, OR, etc.; and/or special-purpose functions such as sigmoid function, transcendental functions, etc. In addition, the functional units 42 may have a low-power or off state when they are not being used drastically reducing their power consumption. The functions that may be implemented by each functional unit 42 may be different for different functional units 42. This particular function provided by a functional unit 42 is determined by a bit value in a mesh 33 configuration function register 47 associated with each of the functional units 42 as set by a loaded configuration image 27.

While generally the dataflow processor 32 may execute independently from and asynchronously with respect to the lightweight core 30, the data passing through the dataflow processor 32 will be clocked, for example using a self-contained clock element 35, to provide predictable execution. Specifically, data may flow through the mesh 33 of functional units 42 and switches 44 to move generally horizontally and/or downwardly by one step for each clock cycle where a step may be data flow from an input point 46 to a switch 44, or from a switch 44 to a second switch 44, or from a switch 44 to an output point 48, or from a switch 44 to a functional unit 42, or from a functional unit 42 to a switch 44. In this way, the coordination of operands to arrive at functional units 42 as required by a calculation may be controlled by the interposition of switches (or no-op functional units) in the data path in an amount necessary to obtain the desired delay. The necessary routing may be predetermined and incorporated into the configuration image 27 either manually or through use of a special program (such as a complier) for generating configuration images 27.

Generally, the dataflow processor 32 does not provide a program counter or control flow instructions but rather the control flow is determined by the interconnection of the switches 44 and functional units 42. In addition, access to register files or memories by the functional units 42 is not required. Calculations occur as soon as operands are available within the constraint of the clocking which may occur at high speed. The functional units 42 may be implemented with dataflow circuitry or with iterating circuitry operating at sufficient speed to complete calculations within one clock cycle. The dataflow processor 32 thus provides extremely fast calculation.

Each of the input points 46 and output points 48 of the dataflow processor 32 are associated with a first-in, first-out buffer 50 that may be filled asynchronously or emptied asynchronously to the processing performed by the dataflow processor 32 under the control of the stream processor 36. The buffers 50 thus provide for parallel data acquisition and data processing. In one embodiment, each buffer 50 may be provide eight, sixty-four bits words, thus being 8×64 wide and have an arbitrary depth. The invention also contemplates that the different widths may be employed as desired. Additional similar buffers 50' independent of input points 46 and output points 48 may be used for storing streaming addresses for indirect loads and stores as will be discussed. The input points 46 connect to the respective buffers 50 through an interconnect 41 providing fixed connections allowing given input buffers 50 to communicate with one or more of the first row of switches 44, with each switch 44 receiving data from only one of any of the buffers 50 according to a predefined interconnection pattern. Accordingly, different 64-bit words from a given buffer 50 may be forwarded to different switches 44.

In addition, the output points 48 connect to respective buffers 50 through an interconnect 49 providing fixed connections allowing given output points 48 to connect to one or more output buffers 50, each output buffer receiving data from only one of any of the output points 48 according to a predefined interconnection pattern.

The stream processor 36 provides a simple state machine that can move data autonomously between the memory system 16 and another storage location once it receives program instructions from the lightweight core 30. Generally the stream processor 36 will move input data from the memory system 16 to either the scratchpad memory 34 or the buffers 50, or from the scratchpad memory 34 to the input buffers 50, or may move output data from the scratchpad memory 34 to the memory system 16, or from buffers 50 to the scratchpad memory 34 or the memory system 16 or another buffer 50 according to a predefined pattern. In this regard, the stream processor 36 may provide for three separate circuits, one for memory, one for scratchpad, and one for controlling re-cycling of data from output port to input port and also the generation of constant values. These three circuits may operate independently (but for synchronization through the memory access interface 40) for high speed operation.

The stream processor 36 may also provide for the movement of the data of a configuration image 27 to the mesh 33 configuration registers 45 and 47 of the dataflow processor 32 as is discussed below for configuration.

More specifically, and as mentioned briefly above, the stream processor 36 operates according to configuration instructions, stream instructions, and barrier instructions that may be issued by the lightweight core 30. A configuration instruction format is shown in Table I below.

TABLE I

Configuration Instruction

| Command Name | Parameters | Description |
| --- | --- | --- |
| SD_Config | Configuration image address, Size | Set dataflow processor configuration from configuration image at address |

This instruction provides the stream processor 36 with the starting address and size of a configuration image 27 in the memory system 16 and operates to load the configuration image 27 into the mesh 33 configuration registers 45 and 47. This process will provide the desired configuration of the mesh 33 of the dataflow processor 32 and the functions of the functional units 42 needed for acceleration of the program 22, for example, as triggered by the processor 12 communicating over the control lines 26 to the accelerator 24.

The stream instructions (shown in Table II) provided by the lightweight core 30 to the stream processor 36 generally identify a source of data, destination data, and the data pattern as follows:

TABLE II

Stream Instructions

| Command Name | Parameters | Description |
| --- | --- | --- |
| SD_Mem_Scr | Source Memory Address, Access Size, Stride Length, Number of Strides, Destination Scratchpad Address | Read from memory system 16 to the scratchpad memory 34 using the indicated access pattern |
| SD_Scr_Port | Source Scratchpad Address, Access Size, Stride Length, Number of Strides, Input Port Number | Read from scratchpad memory 34 to the designated input point 46 using to the indicated pattern |
| SD_Mem_Port | Source Memory Address, Access Size, Stride Length, Number of Strides, Input Port Number | Read from memory system 16 to the designated input point 46 using the indicated pattern |
| SD_Const_Port | Constant Value, Number of Elements, Destination Port Number | Send a series of constant values to the designated input point 46 |
| SD_Chuck_Port | Number of Elements, Source Port Number | Eject a defined series of values from a buffer 50 of the designated output point 48 |

TABLE II-continued

Stream Instructions

| Command Name | Parameters | Description |
| --- | --- | --- |
| SD_Port_Port | Source Port Number, Number of elements, Destination Port Number | Recirculate a defined series of values from the designated output point 48 to the designated input point 46. |
| SD_Port_Scr | Source Port Number, Number of elements, Destination Scratchpad address. | Write a defined series of values from the designated output point 48 to scratchpad memory 34 |
| SD_Port_Mem | Source Port Number, Access Size, Stride Length, Number of Strides, Destination Memory Address. | Write from the designated output point 48 to memory system 16 using the indicated pattern |
| SD_IndPort_Port | Indirect Port Number, Offset Address, Destination Port Number | Indirect load from memory system 16 based on address data in designated indirect output point 48 for storage in designated destination port |
| SD_IndPort_Mem | Indirect Port Number, Offset Address, Destination Port Number | Indirect store to memory system 16 based on address in indirect port from designated output port |

These instructions transfer data between storage locations autonomously using a designated pattern as will be discussed below.

Indirect addressing is possible using stored data (for example, in a buffer 50') as an address value. In indirect addressing, data, for example, from the streaming pattern, is used as the address to obtain further data that is operated on by the functional units 42. This indirect addressing effects pointers, useful, for example, when accessing the rows of a sparse matrix. The stream processor 36 may provide capability to facilitate indirect access by chaining two streams together, the first stream for accessing a contiguous or strided pattern of pointers, and subsequent streams to load those pointers' values from the memory system 16 and deliver them to the reconfigurable dataflow processor 32. Additional instructions are provided to generate constant values (rather than loading these from memory) and to discard unused output values (as opposed to loading them into nonfunctional memory areas).

Generally each of these instructions may be issued directly by the processor 12 as part of the instruction set architecture of the accelerator and the data in these instructions used with minimal processing by the lightweight core 30 to control other components of the accelerator.

Figure 5:
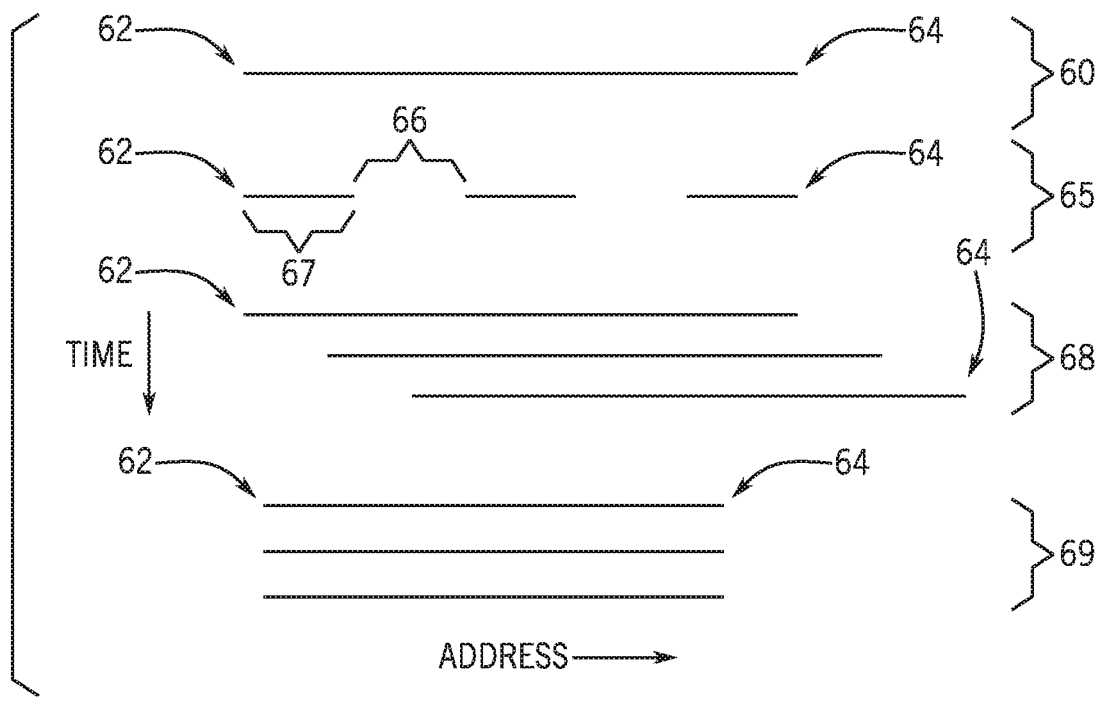
FIG. 5 is a schematic representation of predetermined memory access patterns that can be implemented by the stream processor.

Referring now to FIG. 5, the stream processor 36 provides a state machine for autonomous loading or writing data between storage locations using simple patterns of memory access. The simplest pattern is a linear pattern 60 that reads (or writes) sequentially every memory address between a starting address 62 and ending address 64 designated by the instruction. This pattern is indicated by setting the stride length equal to zero. The starting address is designated in the above instructions as the source address for reads and the destination address for writes while the ending address is either the number of elements when the source is a port, or a product of the access size times the stride length times the number of strides added to the starting address when the source is the memory or scratchpad.

Alternatively, the stream processor 36 may be programmed to use a strided pattern 65 by setting the stride length equal to a nonzero value which describes a gap or stride 66 in addresses between access portions 67 defined by the access size.

Similarly, an overlapped axis pattern 68 may be invoked by setting the access size to greater than the stride size which signals an overlapping pattern. A repeated pattern 69 is easily obtained by setting the stride length to zero with the repetition being provided by the number of strides.

The lightweight core 30 may also provide for barrier instructions to the stream processor 36 which block the issuance of new memory access instructions until certain previous instructions associated with a data storage resource are complete. For example, a barrier instruction (shown in Table III below) associated with a writing to the scratchpad memory 34 will block subsequent writing to the scratchpad memory 34 until all writings to the scratchpad memory 34 before the barrier instruction are completed. Barriers can also be used to signal completion of the calculation to the lightweight core 30.

TABLE III

Barrier Instructions

| Command Name | Parameters | Description |
| --- | --- | --- |
| SD_Bar_Scr_Rd | — | Barrier for Scratchpad Reads |
| SD_Bar_Scr_Wr | — | Barrier for Scratchpad Writes |
| SD_Bar_All | — | Barrier to wait for all commands completion |

Figure 4:
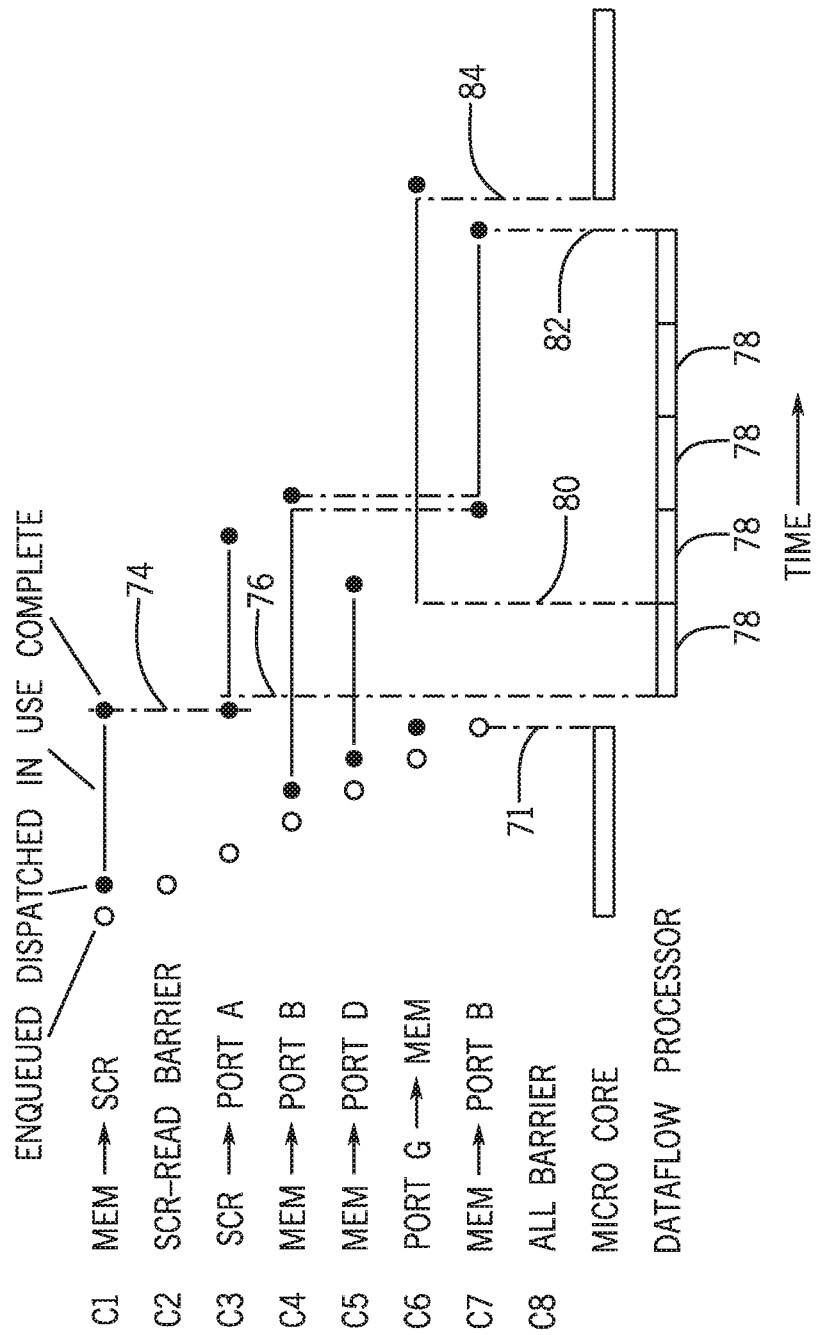
FIG. 4 is a timing diagram showing processing of a stream of data using the dataflow graph of FIG. 3 such as provides a high degree of parallelism.

Referring now to FIGS. 3 and 4, an example calculation may provide a data flow graph 70 receiving inputs at input buffers 50 designated A, B and D communicating in this example with single adjacent input points 46. Successive values from buffers 50 associated with ports A and B are provided through appropriate switches 44 to a functional unit 42a to be multiplied together. In the simplest case, the necessary operands for a given cycle of calculations (being one pass through the mesh 33 from input points 46 to output points 48) are coordinated to be released from the buffers 50 into the mesh 33 at the same time. The release of operands may be monitored by a simple ready-monitoring logic, which knows when to trigger a fire signal based on the data 'size' configured for each buffer. The invention, however, also contemplates that staggered release from the buffers 50 may be used as part of the synchronization of operands at particular functional units 42 as they pass through the mesh 33. The output of functional unit 42a passes through appropriate switches to a functional unit 42b to be added to the value of the buffer 50 associated with input point 46 designated D. Note that the data from buffers A and B pass through the same number of switches 44 and functional units 42 before being received at functional unit 42b as the data from port D is being received at the functional unit 42b ensuring that the corresponding data in the buffers 50 are processed in this calculation. The configuration image 27 for each particular algorithm executed by the dataflow processor 32 is adjusted to ensure proper coordination of data flow path lengths either manually or through the use of a program such as a compiler. A compiler may operate by identifying particular operations of the executed algorithm to sequential time slices according to data dependencies of the data used by the operations, ensuring that operations requiring data dependent on earlier operations are in later time slices. The path of data from an input port to each functional units 42 associated with each of the operations (clock cycles through switches 44 or functional units 42) may then be adjusted to be equal. Thus, for example, for the addition operation at functional unit 42a, the path of data from the buffers A, B and D is made equal with the path from buffer A passing through two switches 44 and one functional unit 42a (during four clock cycles) as shown by a dotted line 43a, the path from buffer B passing through two switches 44 and one functional unit 42a (during four clock cycles) as shown by a dotted line 43b, and the path from buffer D passing through three switches 44 (during four clock cycles) as shown by a dotted line 43c. A staggered or late release of operands from the buffers 50 may be used to simulate additional clock cycles in some versions of the invention.

Upon completion of the addition at functional unit 42b, the output passes to output buffer 50 designated G.

Generally this process will be repeated for multiple data value stored in the input ports A and B. Each multiplication at functional unit 42a being performed concurrently with additions at functional unit 42b in the manner of a pipeline and providing for high throughput.

Referring now to FIG. 4, this calculation may be implemented through eight instructions issued from the lightweight core 30 designated in FIG. 4 as instructions (C1-C8). As depicted, these instructions will be enqueued, dispatched and completed at different times indicated on the horizontal scale. Before the calculation, the dataflow processor 32 is configured by configuration instructions (not shown in this example). Once all of the instructions have been enqueued, the lightweight core 30 may be put into an idle state at time 71.

The first instruction (C1) provides a transfer from memory system 16 to the scratchpad memory 34 of data that will ultimately used to load the buffer 50 of port A. This instruction begins executing immediately after it is enqueued. Is important that the scratchpad memory not be read until it is fully loaded and accordingly the next instruction (C2) provides a scratchpad memory read barrier ensuring that there is no reading of the scratchpad memory 34 until instruction (C1) is complete. Accordingly instruction (C3), which provides a reading of the scratchpad memory 34 into port A, is delayed until completion of instruction (C1) at time 74. The barrier instructions may be simply enforced by stalling subsequent commands from the dataflow processor 32 related to the barrier condition allowing all previous commands to proceed in parallel.

The barrier instruction (C2) does not block instruction (C4) reading memory to the buffer of port B because there is no conflicted resource. Accordingly this transfer process may begin before and continue in parallel with the transfer process of instruction (C3). Similarly transfer from memory system 16 to port D may be performed shortly after this instruction is enqueued.

At time 76 values will be present in each of ports A, B, and D allowing the dataflow processor 32 to begin calculation and these values to be released from their buffers 50. These calculations performed by the dataflow processor 32 will be repeated using successive values in each of the buffers 50 of the input points 46 and provide new calculated values into the output buffers 50 of the output points 48 as indicated by processing cycles 78.

Once the first processing cycle 78 is completed, at time 80, a writing from the output buffer of port G to memory system 16 may begin.

After the conclusion of all processing cycles 78 for the data held in the buffers 50, at time 82, the writing from port G to memory system 16 concludes releasing the barrier of instruction C8 and signaling to the lightweight core 30 that the calculation is complete so that new instructions may be received from the lightweight core 30. The "all" barrier of instruction C8 is released when all of the buffers 50 are empty detected by hardware.

During the processing of instruction (C4), after loading port B from memory, a second instruction (C7) may be enqueued also loading from memory system 16 to Port B. A natural barrier is created in the circumstances by the stream processor 36 which serializes loading of buffer 50 intrinsically.

Also note that the second stream for instruction (C7) for loading data into buffer B may not have the same access pattern as the previous one. Also, its type (e.g., source or destination) can be different as well. More generally, the stream commands for a given buffer 50 can change while the dataflow architecture and other stream commands are actively being processed. This leads to more programming flexibility and parallelism.

It will be appreciated that substantial parallelism is obtained in this processing provided by the dataflow processor 32 based on the overlapping line segments indicated in FIG. 4. This, combined with the parallelism obtained by having multiple data flow processors 28 that may be enlisted by the processor 12, permits extremely fast processing.

Figure 6:
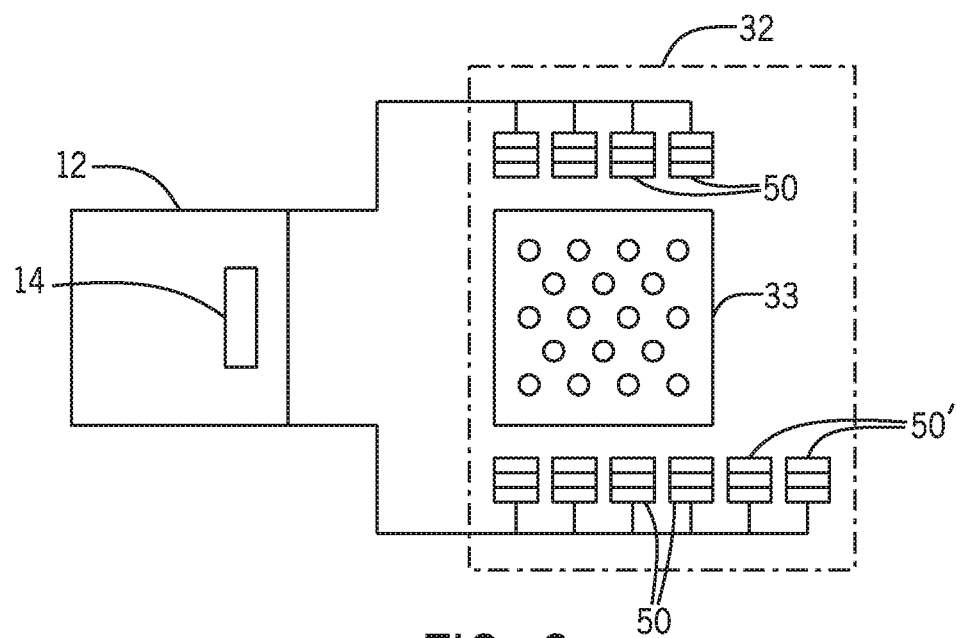
FIG. 6 is a block diagram of a processor system using a general-purpose core and the dataflow processor of FIG. 3 directly.

Referring now to FIG. 6, it will be appreciated that the element of the dataflow processor 32 may also be used independently of the stream processor 36, scratchpad memory 34 and lightweight core 30 by having the processor 12 directly handle memory accesses and load and read the buffers 50 as well as provide the memory image files to configure the switches 44 and functional units 42 This configuration greatly simplifies the architecture; however, it requires the processor 12 to handle memory access patterns. This additional duty performed by the processor 12 may still be efficient when there are long computational runs. In this case the buffers 50 may also be increased in size to consolidate memory access operations.

The lightweight core 30 may also expose hardware parameters of the hardware accelerator 24 including a number and type of functional units 42, a depth of buffers 50 and 50', the size of the scratchpad memory 34, and the longest recurrence (recycling) of data through the dataflow processor 32 for use by a compiler as is generally understood in the art.

As used herein, predefined memory access pattern means a limited number of patterns that may be defined prior to the calculation for which the memory accesses require to be performed as opposed to memory access patterns that are a function of calculations made. Autonomous as is used herein means without necessary further guidance by the micro core or the data fabric.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to microcontroller should be understood to include any circuit capable of executing the functions described herein including but not necessarily limited to von Neumann architectures.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A data flow computer architecture comprising:
    a dataflow processor providing set of functional units and programmable switches interconnecting the functional units between input ports receiving input values and output ports providing output values, the functional units providing programmable arithmetic functions and the interconnection providing paths from input ports through functional units to output ports determined by the switch programming;
    a clock requiring synchronous movement of data among functional units and programmable switches by one step for each clock cycle, a step being from a functional unit to a switch or from a switch to a functional unit; and
    a configuration store holding data configuring the interconnection of the functional units and the arithmetic functions of the functional units to execute a predetermined program in which data received at the input ports is clocked through the functional units and programmable switches to the output ports to implement a sequence of arithmetic functions on the data;
    wherein the functional units operate so that calculations occur as soon as operands are available at the functional units and so that memories for storing operands at the functional units are not required, and wherein the configuration store defines paths of data through the dataflow processor ensuring corresponding operands arrive at the same time at each functional unit according to the program by adjusting the path of data through the dataflow processor without a need for additional buffer storage elements.

2. The dataflow computer architecture of claim 1 further including a set of buffers associated with input ports of the dataflow processor, the buffers synchronized with the clock to release data to the input ports at times adapted to ensure corresponding operands arrive at the same time at each functional unit according to the program and the configuration store.

* * * * *